US008725921B2

(12) United States Patent
Takeuchi

(10) Patent No.: US 8,725,921 B2
(45) Date of Patent: May 13, 2014

(54) VIRTUAL MULTI-PROCESSOR SYSTEM

(75) Inventor: Akira Takeuchi, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/553,519

(22) Filed: Jul. 19, 2012

(65) Prior Publication Data

US 2012/0284443 A1 Nov. 8, 2012

Related U.S. Application Data

(63) Continuation of application No. PCT/JP2010/004771, filed on Jul. 27, 2010.

(30) Foreign Application Priority Data

Mar. 18, 2010 (JP) ................................. 2010-062245

(51) Int. Cl.
*G06F 13/24* (2006.01)
*G06F 13/32* (2006.01)

(52) U.S. Cl.
USPC .......................................... 710/260; 710/267

(58) Field of Classification Search
CPC ....... G06F 9/48; G06F 9/4806; G06F 9/4843; G06F 9/4881; G06F 9/50; G06F 9/5005; G06F 9/5038; G06F 2213/24; G06F 2213/2414
USPC ................... 710/240–244, 260–269
See application file for complete search history.

(56) References Cited

U.S. PATENT DOCUMENTS

| | | | | |
|---|---|---|---|---|
| 3,710,328 A * | 1/1973 | Hunter et al. | ................. | 710/260 |
| 5,325,520 A * | 6/1994 | Nguyen et al. | .................. | 714/17 |
| 5,542,076 A * | 7/1996 | Benson et al. | ................ | 710/260 |
| 5,881,296 A * | 3/1999 | Williams et al. | .............. | 710/263 |
| 6,477,600 B1 * | 11/2002 | Baxter et al. | .................. | 710/260 |
| 6,493,779 B1 * | 12/2002 | Guthrie et al. | ................ | 710/260 |
| 6,763,415 B1 * | 7/2004 | Tischler | ........................ | 710/240 |
| 7,574,547 B1 * | 8/2009 | Avudaiyappan | .............. | 710/244 |

(Continued)

FOREIGN PATENT DOCUMENTS

| | | | | |
|---|---|---|---|---|
| CN | 102495816 A * | 6/2012 | ............. | G06F 13/24 |
| JP | 10-097433 | 4/1998 | | |

(Continued)

OTHER PUBLICATIONS

"NB9006367: Method for Detecting and Processing I/O Interrupts During Software Simulation of a System/370 Architecture Processor", Jun. 1, 1990, IBM, IBM Technical Disclosure Bulletin, vol. 33, Iss. 1B, pp. 367-368.*

(Continued)

*Primary Examiner* — Faisal M Zaman
(74) *Attorney, Agent, or Firm* — McDermott Will & Emery LLP

(57) ABSTRACT

A virtual multi-processor system includes a plurality of logic processors. Moreover, the virtual multi-processor system includes a logic processor controller configured to allocate a time slice to each of the logic processors to control the logic processors so that the logic processors sequentially run in a time-sharing manner. When a request for interrupt processing occurs, an external interrupt controller performs control so that a logic processor that has a time slice within which the interrupt processing is possible and that runs next executes the interrupt processing.

2 Claims, 5 Drawing Sheets

(56) References Cited

U.S. PATENT DOCUMENTS

| | | |
|---|---|---|
| 2003/0065856 A1* | 4/2003 | Kagan et al. ............... 710/263 |
| 2003/0149864 A1 | 8/2003 | Furukawa et al. |
| 2003/0172215 A1* | 9/2003 | Franke et al. ............... 710/264 |
| 2005/0015767 A1* | 1/2005 | Nash et al. .................. 718/102 |
| 2005/0033881 A1 | 2/2005 | Yao .............................. 710/52 |
| 2005/0081075 A1* | 4/2005 | Kocev et al. ................ 713/501 |
| 2005/0246466 A1* | 11/2005 | Wright et al. ............... 710/260 |
| 2007/0198759 A1* | 8/2007 | Agarwal ...................... 710/260 |
| 2007/0209037 A1* | 9/2007 | Sato et al. .................... 718/107 |
| 2008/0071947 A1* | 3/2008 | Fischer et al. ................ 710/48 |
| 2008/0140896 A1 | 6/2008 | Todoroki et al. |
| 2008/0209162 A1 | 8/2008 | Furukawa et al. |
| 2009/0172230 A1* | 7/2009 | Balasubramanian ......... 710/263 |
| 2010/0161939 A1* | 6/2010 | Melpignano et al. .......... 712/29 |
| 2011/0106995 A1* | 5/2011 | Gopalakrishnan et al. ... 710/269 |

FOREIGN PATENT DOCUMENTS

| | | | |
|---|---|---|---|
| JP | 2000-322277 | 11/2000 | |
| JP | 2003-271399 | 9/2003 | |
| JP | 2008-123157 | 5/2008 | |
| JP | 2009-104611 | 5/2009 | |
| KR | 20030077696 A | * 10/2003 | ............... G06F 9/46 |

OTHER PUBLICATIONS

Walker, W.; Cragon, H.G., "Interrupt processing in concurrent processors," Computer, vol. 28, No. 6, pp. 36,46, Jun. 1995.*

International Search Report issued in International Patent Application No. PCT/JP2010/004771, mailed Nov. 2, 2010.

* cited by examiner

VIRTUAL MULTI-PROCESSOR SYSTEM

CROSS-REFERENCE TO RELATED APPLICATION

This is a continuation of PCT International Application PCT/JP2010/004771 filed on Jul. 27, 2010, which claims priority to Japanese Patent Application No. 2010-062245 filed on Mar. 18, 2010. The disclosures of these applications including the specifications, the drawings, and the claims are hereby incorporated by reference in their entirety.

BACKGROUND

The present disclosure relates to virtual multi-processor systems to operate a plurality of logic processors in a pseudo-parallel manner by a physical single processor.

So-called virtual multi-processor systems in which a plurality of processors are not physically provided, but a plurality of logic processors are operated virtually in a pseudo-parallel manner by a single processor have been known (for example, see Japanese Patent Publication 2003-271399). Japanese Patent Publication 2003-271399 describes an example of virtual multi-processor systems in which when on an logic processor, an interrupt specific to the logic processor is caused, an execution period in a subroutine dedicated to interrupt processing is included in an execution period (time slice) of the interrupted logic processor.

SUMMARY

However, in case of the interrupt processing described above, for example, if the time slice of the interrupted logic processor is expired during the interrupt processing, and switching is performed so that another logic processor runs, the interrupted logic processor has to wait for allocation of a next time slice with the interrupt processing being uncompleted. That is, in the conventional virtual multi-processor systems, a worst-case execution period for completing interrupt processing (worst-case execution period) may be equal to or longer than a period from expiration of a time slice to reallocation of a time slice (time slice cycle).

An example virtual multi-processor system according to the present disclosure is capable of shortening a worst-case execution period for completing interrupt processing (worst-case execution period).

For example, a virtual multi-processor system includes: a plurality of logic processors; a logic processor controller configured to allocate a time slice to each of the logic processors to control the logic processors so that the logic processors sequentially run in a time-sharing manner; and an external interrupt controller configured to allow one of the logic processors that has a time slice within which an interrupt processing is possible and that runs next to execute the interrupt processing when a request for the interrupt processing occurs.

With this configuration, a logic processor that has a time slice within which the interrupt processing is possible and that runs next is allowed to execute the interrupt processing. Thus, an execution period for completing the interrupt processing can be shorter than the time slice cycle.

DETAILED DESCRIPTION

Figure 1:
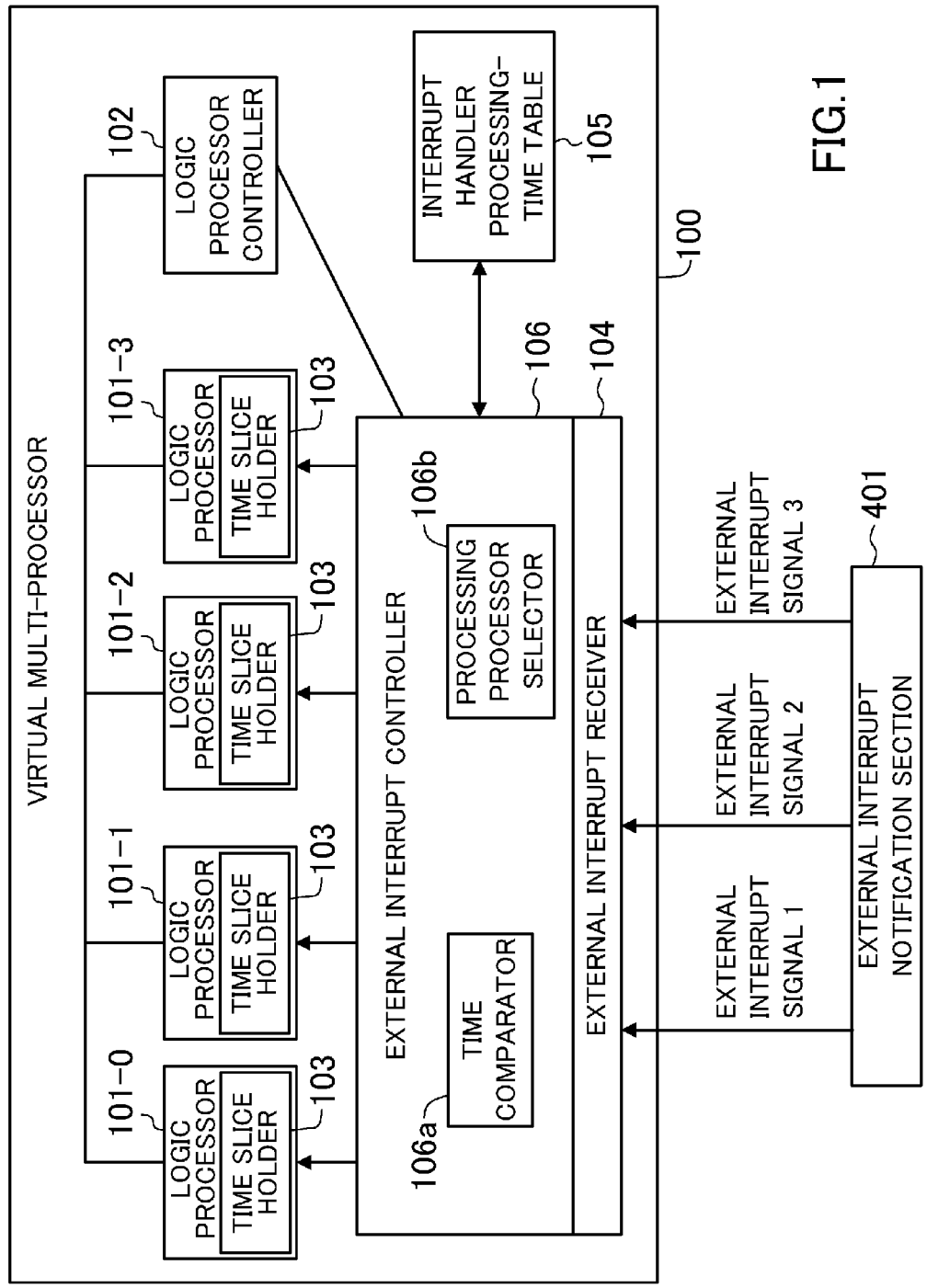
FIG. 1 is a block diagram illustrating a configuration of a virtual multi-processor system according to a first embodiment.

A configuration and interrupt processing of a virtual multi-processor system to operate a plurality of logic processors in a pseudo-parallel manner by a single processor will be described with reference to the drawings below. Note that the below-described embodiments are essentially preferable examples which are illustrative and do not limit the present invention, its applications, and the scope of use of the invention. In description of the embodiments, like reference characters are used to designate identical or equivalent elements, and explanation thereof is not repeated.

In the following description, a worst-case execution period refers to a worst-case execution period for completing interrupt processing, and a time slice cycle refers to a period from expiration of a time slice of a logic processor (described below) to reallocation of a time slice to the logic processor.

First Embodiment of Invention

FIG. 1 is a block diagram illustrating a configuration of a virtual multi-processor system 100 according to a first embodiment. The virtual multi-processor system 100 includes a plurality of logic processors 101, a logic processor controller 102, time slice holders 103, an external interrupt receiver 104, and an interrupt handler processing-time table 105. Note that in FIG. 1, in order to distinguish the logic processors 101 from one another, branch numbers starting with zero are added to last digits of the reference numbers.

Each logic processor 101 is a processor which operates by sharing a computation unit in a normal physical processor in a time-sharing manner. That is, each logic processor 101 is a unit which can be logically recognized as a unit for processing software by a programmer.

The logic processor controller 102 allocates a time slice to each logic processor 101 to control the logic processors 101 so that the logic processors 101 sequentially run in a time-sharing manner. Note that the logic processor controller 102 can flexibly change a remaining time slice of a running logic processor 101. Specifically, the remaining time slice is changed to zero to promote switching to a next logic processor 101, or the remaining time slice is extended to be equal to or longer than processing time of an interrupt handler so that a currently running logic processor 101 can execute interrupt processing.

Each time slice holder 103 is configured to hold the remaining time slice of the running logic processor 101. In the present embodiment, the time slice holders 103 are formed by registers each of which is unique to the logic processor 101 (see FIG. 1). A time slice holder 103 is not necessarily provided to each logic processor 101, but may be configured to hold a remaining time slice of only the currently running logic processor 101 and to be shared among the logic processors 101 under monitoring by the logic processor controller 102.

The external interrupt receiver 104 receives interrupt signals from an external interrupt notification section 401 (external interrupt signals 1-3 in FIG. 1).

The interrupt handler processing-time table 105 stores processing time of interrupt handlers. The interrupt handler processing-time table 105 may store processing time predetermined for the interrupt handlers, or history of processing time of when the interrupt handlers were executed in the past.

An external interrupt controller 106 includes a time comparator 106a and a processing processor selector 106b, and controls which logic processor 101 processes an interrupt. Specifically, when a request for interrupt processing occurs, the external interrupt controller 106 allows a logic processor 101 that has a time slice within which the interrupt processing is possible, and runs next to execute the interrupt processing. More specifically, when the external interrupt receiver 104 receives an interrupt signal, the external interrupt controller 106 acquires, from the interrupt handler processing-time table 105, processing time of an interrupt handler corresponding to the received interrupt signal. The external interrupt controller 106 also acquires, from the time slice holder 103, a remaining time slice of a currently running logic processor 101. The time comparator 106a compares the acquired processing time with the remaining time slice. Based on the comparison result, the processing processor selector 106b selects a logic processor 101 which is allowed to process the interrupt, and delivers a notification to the logic processor 101.

Interrupt Processing Operation of Virtual Multi-Processor System 100

Figure 2:
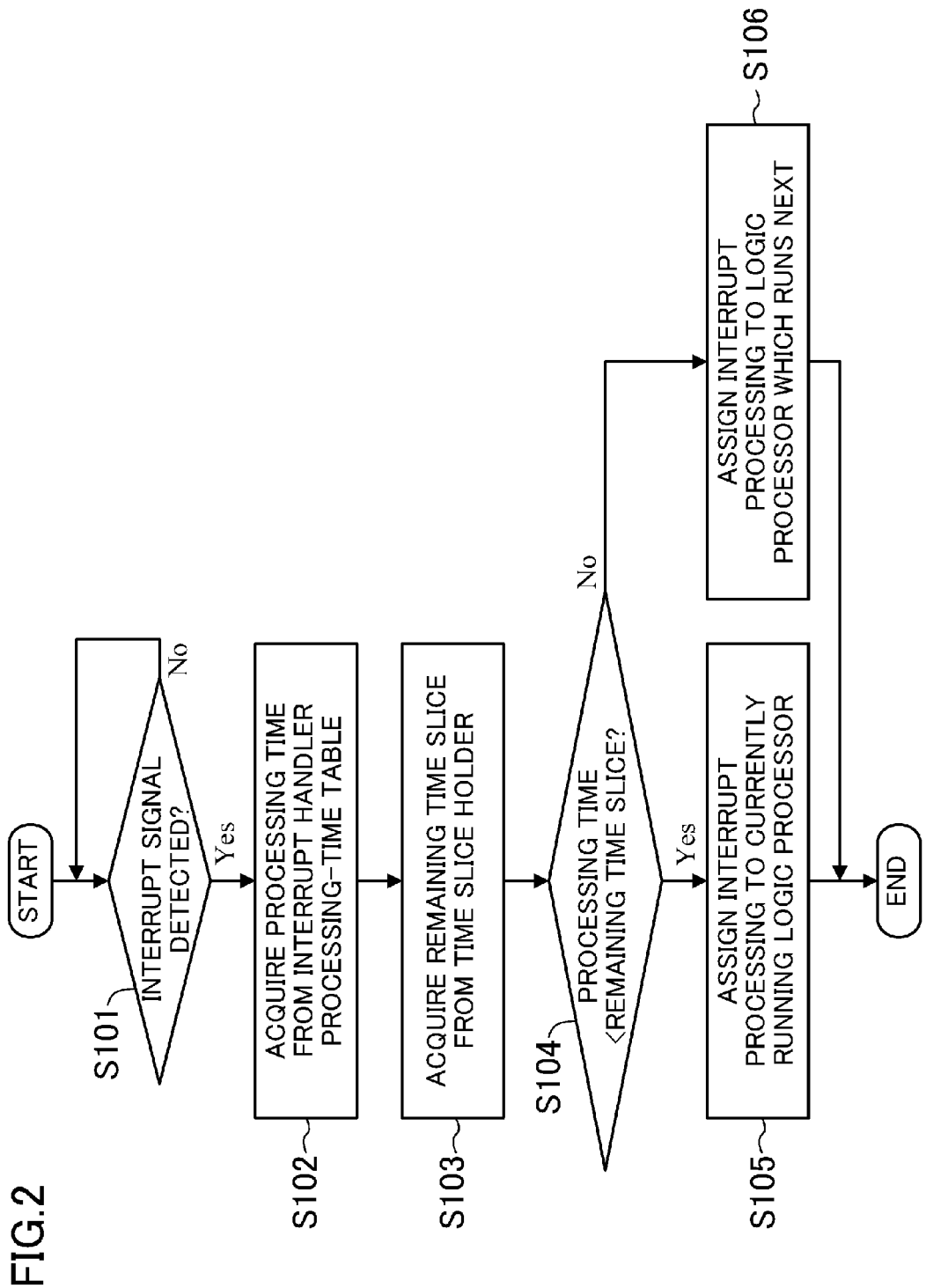
FIG. 2 is a flow chart illustrating interrupt processing operation in the virtual multi-processor system.

FIG. 2 is a flow chart illustrating interrupt processing operation in the virtual multi-processor system 100. Description will be given below based on the flow chart.

In step S101, the external interrupt controller 106 detects whether or not the external interrupt receiver 104 has received an interrupt signal. If the external interrupt receiver 104 has received the interrupt signal, the operation proceeds to step S102.

In step S102, the external interrupt controller 106 acquires, from the interrupt handler processing-time table 105, processing time corresponding to the interrupt signal.

In step S103, the external interrupt controller 106 acquires, from the time slice holder 103, a remaining time slice corresponding to a currently running logic processor 101.

In step S104, the external interrupt controller 106 compares the processing time corresponding to the interrupt signal with the remaining time slice. If the processing time is shorter than the time slice, the operation proceeds to step S105. If not, the operation proceeds to step S106.

In step S105, the external interrupt controller 106 assigns interrupt processing to the currently running logic processor 101.

On the other hand, in step S106, the external interrupt controller 106 assigns the interrupt processing to a next logic processor 101 to which switching will be performed. An interrupt may immediately be notified to the next logic processor 101, or delivery of an interrupt notification may be held until the interrupt notification may be delivered upon the switching to the next logic processor 101.

Figure 3:
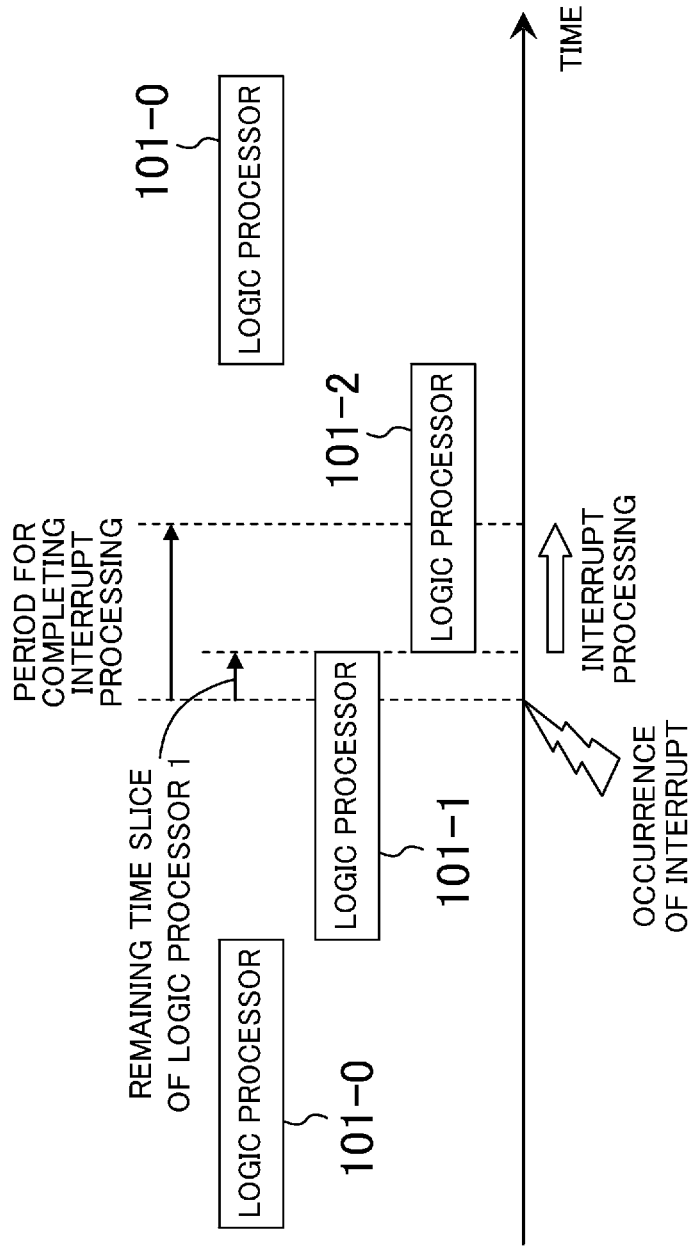
FIG. 3 is a view illustrating an example of interrupt processing according to the flow chart of FIG. 2.

FIG. 3 is a view illustrating an example of the interrupt processing according to the flow chart of FIG. 2. In the example, a logic processor which is running at the occurrence of the interrupt is the logic processor 101-1. Moreover, in the example, a remaining time slice of the logic processor 101-1 is shorter than a period for completing the interrupt processing. Therefore, the external interrupt controller 106 assigns the interrupt processing to the logic processor 101-2 to which a time slice is allocated after the logic processor 101-1. Thus, in the virtual multi-processor system 100, as illustrated in FIG. 3, the interrupt processing can be completed, at the latest, in the next logic processor.

Advantages of First Embodiment

As described above, according to the present embodiment, the worst-case execution period can be shorter than the time slice cycle. That is, the worst-case execution period for completing interrupt processing can be significantly reduced, and the worst-case execution period can be shortened compared to conventional virtual multi-processor systems.

Second Embodiment of Invention

In a virtual multi-processor system of a second embodiment of the invention, an external interrupt controller 106 and a logic processor controller 102 cooperate with each other to adjust a period of a remaining time slice, which allows immediate interrupt processing. The virtual multi-processor system of the present embodiment is configured to have the same block configuration as that of FIG. 1.

Figure 4:
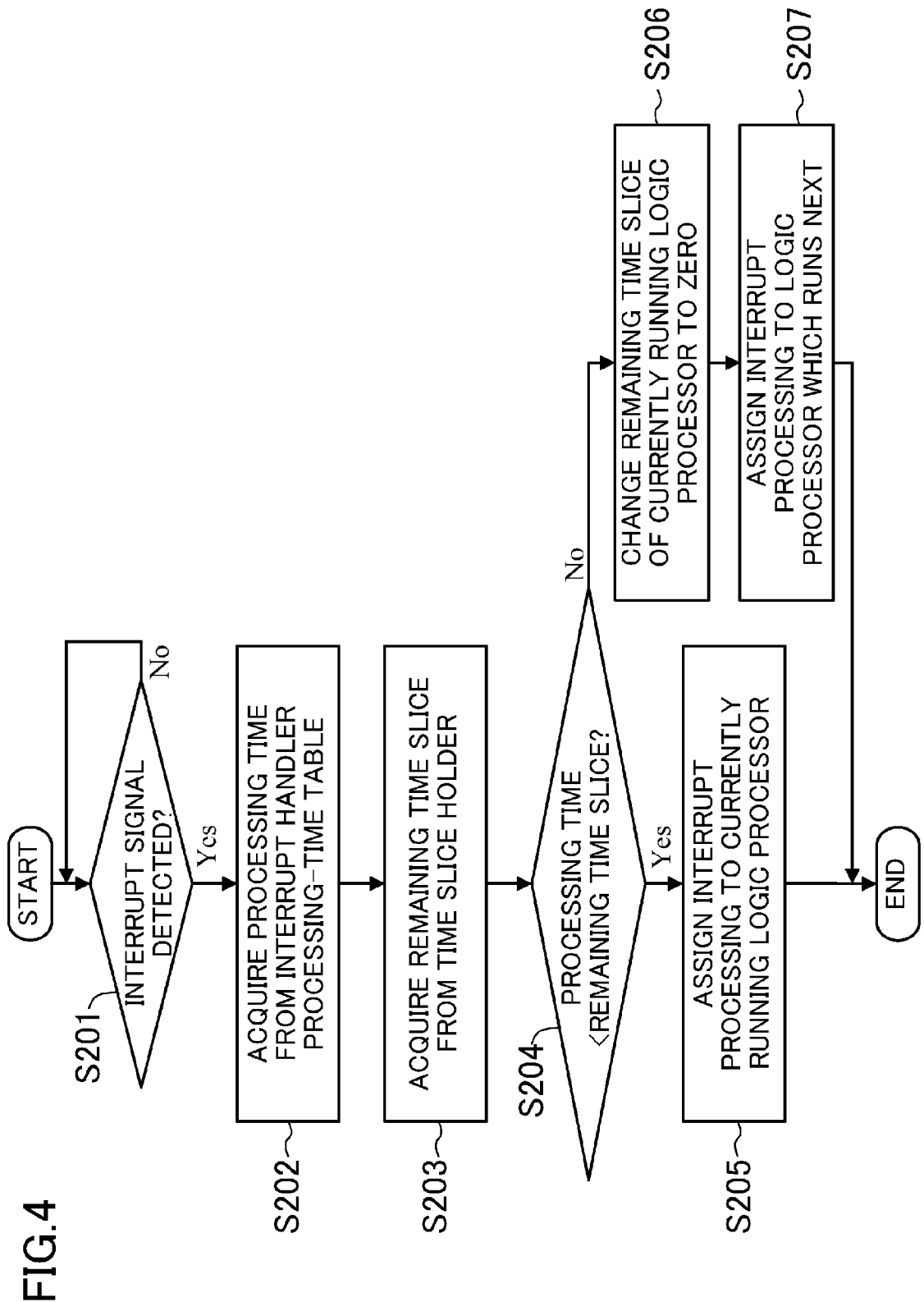
FIG. 4 is a flow chart illustrating interrupt processing operation in a virtual multi-processor system of a second embodiment.

FIG. 4 is a flow chart illustrating interrupt processing operation in the virtual multi-processor system of the second embodiment. The flow chart shows that switching to a next logic processor 101 is promoted, so that the interrupt processing is immediately processed. This will be sequentially described below.

In step S201, the external interrupt controller 106 detects whether or not an external interrupt receiver 104 has received an interrupt signal. If the external interrupt receiver 104 has received the interrupt signal, the operation proceeds to step S202.

In step S202, the external interrupt controller 106 acquires, from an interrupt handler processing-time table 105, processing time corresponding to the interrupt signal.

In step S203, the external interrupt controller 106 acquires, from a time slice holder 103, a remaining time slice corresponding to a currently running logic processor 101.

In step S204, the external interrupt controller 106 compares the processing time corresponding to the interrupt signal with the remaining time slice. If the processing time corresponding to the interrupt signal is shorter than the remaining time slice, the operation proceeds to step S205. If not, the operation proceeds to step S206.

In step S205, the external interrupt controller 106 assigns interrupt processing to the currently running logic processor 101.

In step S206, the remaining time slice of the currently executed logic processor 101 is changed to zero, and then the operation proceeds to step S207. In step S207, the interrupt processing is assigned to a logic processor 101 which next receives a time slice.

In this way, the virtual multi-processor system can immediately start the interrupt processing. That is, according to the present embodiment, flexible time slice allocation can reduce interrupt processing time, so that the interrupt processing can be completed more immediately than conventional virtual multi-processor systems.

Third Embodiment of Invention

Figure 5:
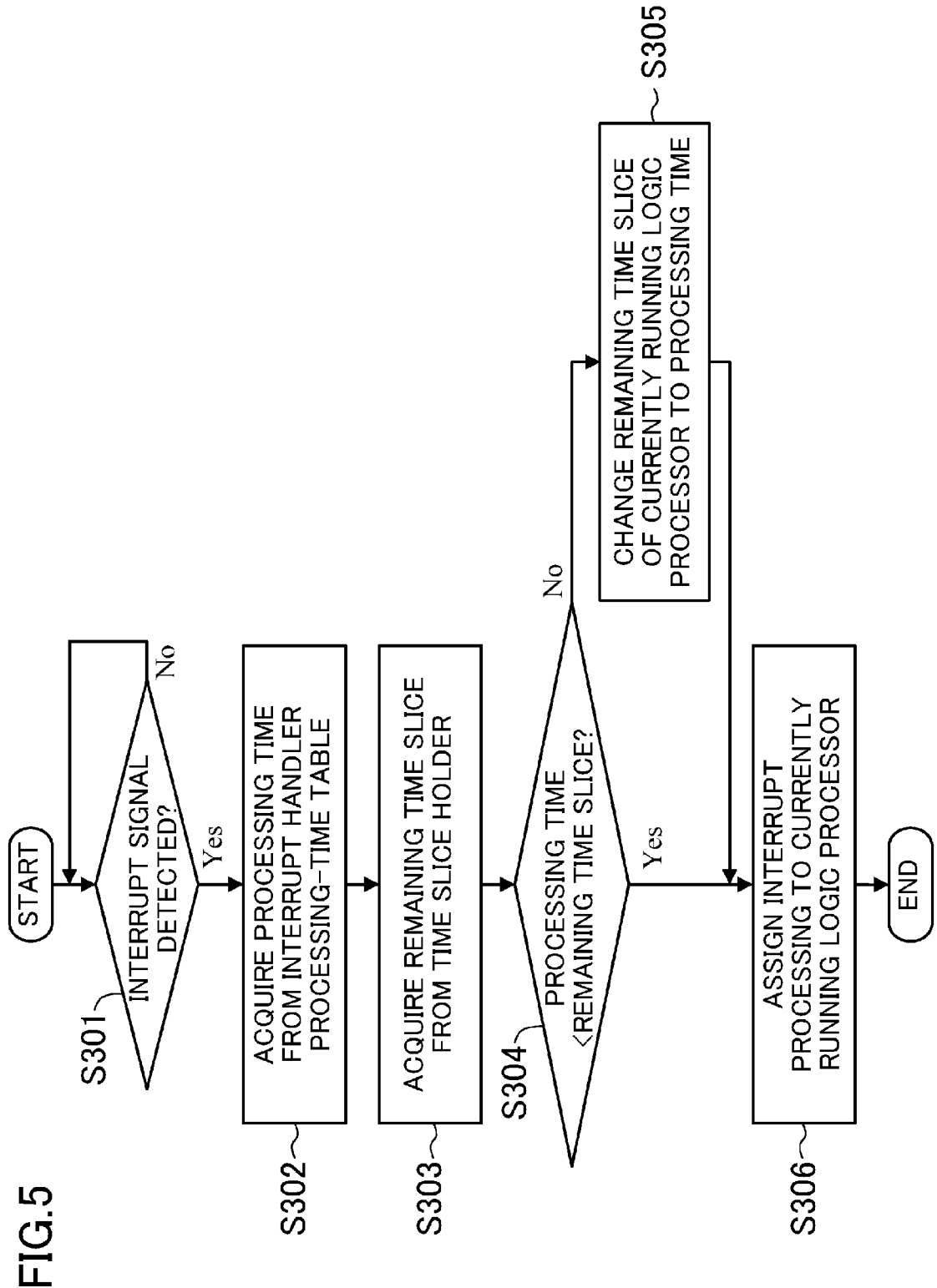
FIG. 5 is a flow chart illustrating interrupt processing operation in a virtual multi-processor system of a third embodiment.

An external interrupt controller 106 and a logic processor controller 102 of a virtual multi-processor system of a third embodiment of the invention also cooperate with each other to achieve immediate interrupt processing. The virtual multi-processor system of the present embodiment is configured to have the same block configuration as that of FIG. 1. FIG. 5 is a flow chart illustrating interrupt processing operation in the virtual multi-processor system of the third embodiment. This will be sequentially described below.

In step S301, the external interrupt controller 106 detects whether or not an external interrupt receiver 104 has received an interrupt signal. If the external interrupt receiver 104 has received the interrupt signal, the operation proceeds to step S302.

In step S302, the external interrupt controller 106 acquires, from an interrupt handler processing-time table 105, processing time corresponding to the interrupt signal.

In step S303, the external interrupt controller 106 acquires, from a time slice holder 103, a remaining time slice corresponding to a currently running logic processor 101.

In step S304, the external interrupt controller 106 compares the processing time corresponding to the interrupt signal with the remaining time slice. If the processing time corresponding to the interrupt signal is shorter than the remaining time slice, the operation proceeds to step S306. If not, the operation proceeds to step S305.

In step S305, the remaining time slice of the currently running logic processor 101 is changed to be longer than or equal to processing time of an interrupt, and then the operation proceeds to step S306.

In step S306, interrupt processing is assigned to the currently running logic processor 101. In this way, in the present embodiment, the interrupt processing is assigned to the current logic processor 101, and completing the interrupt processing in the currently running logic processor 101 can be ensured.

In the above embodiments, the external interrupt controller 106, the logic processor controller 102, etc. are separated into blocks in terms of a functional aspect, but co-residence of these elements may be possible, or software such as operating systems (OSs) in an upper hierarchy, or the like may be allowed to perform processing similar to that performed by these elements.

What is claimed is:

1. A virtual multi-processor system comprising:
a plurality of logic processors;
a logic processor controller configured to allocate a time slice to each of the logic processors to control the logic processors so that the logic processors sequentially run in a time-sharing manner;
an interrupt handler processing-time table; and
an external interrupt controller configured to, when a request for an interrupt processing occurs, acquire interrupt processing time corresponding to the interrupt processing from the interrupt handler processing-time table, and then allow one of the logic processors that has a time slice longer than the interrupt processing time and that runs next to execute the interrupt processing,
wherein when time for the interrupt processing is longer than a remaining time slice of a currently running logic processor, the external interrupt controller changes the remaining time slice to zero via the logic processor controller, and allows the logic processor that runs next to execute the interrupt processing.

2. A virtual multi-processor system comprising:
a plurality of logic processors;
a logic processor controller configured to allocate a time slice to each of the logic processors to control the logic processors so that the logic processors sequentially run in a time-sharing manner;
an interrupt handler processing-time table; and
an external interrupt controller configured to, when a request for an interrupt processing occurs, acquire interrupt processing time corresponding to the interrupt processing from the interrupt handler processing-time table,
wherein when time for the interrupt processing is longer than a remaining time slice of a currently running logic processor, the external interrupt controller changes the remaining time slice via the logic processor controller to be longer than or equal to the time for the interrupt processing, and allows the currently running logic processor to execute the interrupt processing.

* * * * *